US011263492B2

(12) United States Patent
Steiner

(10) Patent No.: US 11,263,492 B2
(45) Date of Patent: *Mar. 1, 2022

(54) AUTOMATIC EVENT RECOGNITION AND CROSS-USER PHOTO CLUSTERING

(71) Applicant: Google LLC, Mountain View, CA (US)

(72) Inventor: Matthew S. Steiner, Mountain View, CA (US)

(73) Assignee: Google LLC, Mountain View, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 16/200,015

(22) Filed: Nov. 26, 2018

(65) Prior Publication Data

US 2019/0362192 A1    Nov. 28, 2019

Related U.S. Application Data

(63) Continuation of application No. 14/162,708, filed on Jan. 23, 2014, now Pat. No. 10,140,552, which is a
(Continued)

(51) Int. Cl.
| | | |
|---|---|---|
| *G06F 16/00* | (2019.01) | |
| *G06K 9/62* | (2022.01) | |
| *G06F 16/583* | (2019.01) | |
| *G06F 16/58* | (2019.01) | |
| *G06K 9/00* | (2022.01) | |
| *G06K 9/64* | (2006.01) | |

(52) U.S. Cl.
CPC ....... *G06K 9/6267* (2013.01); *G06F 16/5838* (2019.01); *G06F 16/5866* (2019.01); *G06K 9/00677* (2013.01); *G06K 9/64* (2013.01)

(58) Field of Classification Search
None
See application file for complete search history.

(56) References Cited

U.S. PATENT DOCUMENTS 5,649,032 A    7/1997    Burt et al.
6,222,939 B1    4/2001    Wiskott et al.
(Continued)

FOREIGN PATENT DOCUMENTS

CN    101167066    4/2008
CN    102148857    8/2011
(Continued)

OTHER PUBLICATIONS

Preliminary Office Action in Brazilian Application No. BR112013021012-5, dated Oct. 22, 2019, 4 pages.
(Continued)

*Primary Examiner* — Debbie M Le
(74) *Attorney, Agent, or Firm* — Lisa Benado; IP Spring

(57) ABSTRACT

Methods, systems, and apparatus, including computer programs encoded on a computer storage medium, for automatic event recognition and photo clustering. In one aspect, methods include receiving, from a first user, first image data corresponding to a first image, receiving, from a second user, second image data corresponding to a second image, comparing the first image data and the second image data, and determining that the first image and the second image correspond to a coincident event based on the comparing.

20 Claims, 5 Drawing Sheets

Related U.S. Application Data continuation of application No. 13/219,835, filed on Aug. 29, 2011, now abandoned.

(60) Provisional application No. 61/444,520, filed on Feb. 18, 2011.

(56) References Cited

U.S. PATENT DOCUMENTS

| | | |
|---|---|---|
| 6,421,358 B1 | 7/2002 | Stimmel et al. |
| 6,513,014 B1 | 1/2003 | Walker et al. |
| 6,557,041 B2 | 4/2003 | Mallart |
| 6,704,725 B1 | 3/2004 | Lee |
| 6,891,561 B1 | 5/2005 | Achituv et al. |
| 6,917,703 B1 | 7/2005 | Steffens et al. |
| 6,940,998 B2 | 9/2005 | Gauroutte |
| 6,947,976 B1 | 9/2005 | Devitt et al. |
| 7,099,510 B2 | 8/2006 | Jones et al. |
| 7,298,960 B1 | 11/2007 | Taylor |
| 7,314,296 B2 | 1/2008 | Machi et al. |
| 7,489,946 B2 | 2/2009 | Srinivasan et al. |
| 7,512,829 B2 | 3/2009 | Mital et al. |
| 7,539,747 B2 | 5/2009 | Lucovsky et al. |
| 7,552,068 B1 | 6/2009 | Brinkerhoff |
| 7,580,952 B2 | 8/2009 | Logan et al. |
| 7,620,902 B2 | 11/2009 | Manion et al. |
| 7,668,405 B2 | 2/2010 | Gallagher |
| 7,804,426 B2 | 9/2010 | Etcheson |
| 7,812,998 B2 | 10/2010 | Miers |
| 7,844,482 B1 | 11/2010 | Larson |
| 7,849,481 B2 | 12/2010 | Moon et al. |
| 7,903,904 B1 | 3/2011 | Loeb et al. |
| 7,916,976 B1 | 3/2011 | Kedikian |
| 7,917,859 B1 | 3/2011 | Singh et al. |
| 8,085,982 B1 | 12/2011 | Kim et al. |
| 8,175,159 B2 | 5/2012 | Suzuki |
| 8,194,940 B1 | 6/2012 | Kiyohara et al. |
| 8,270,684 B2 | 9/2012 | Kiyohara |
| 8,332,512 B1 | 12/2012 | Wu et al. |
| 8,358,811 B2 | 1/2013 | Adam et al. |
| 8,359,285 B1 | 1/2013 | Dicker et al. |
| 8,359,540 B2 | 1/2013 | Darling |
| 8,380,039 B2 | 2/2013 | Luo et al. |
| 8,385,950 B1 | 2/2013 | Wagner |
| 8,391,611 B2 * | 3/2013 | Engtrom .............. G06F 16/58 382/197 |
| 8,412,773 B1 | 4/2013 | Chapweske et al. |
| 8,571,331 B2 | 10/2013 | Cifarelli |
| 8,630,494 B1 | 1/2014 | Svendsen |
| 8,634,603 B2 | 1/2014 | Kiyohara et al. |
| 8,730,397 B1 | 5/2014 | Zhang |
| 8,761,523 B2 | 6/2014 | Cok et al. |
| 8,848,034 B2 | 9/2014 | Fukuzawa |
| 8,861,897 B2 * | 10/2014 | Bercovich ............. G06F 16/50 382/305 |
| 8,914,483 B1 | 12/2014 | Dixon et al. |
| 9,021,045 B2 | 4/2015 | Pennington |
| 9,122,645 B1 | 9/2015 | Amidon et al. |
| 9,277,365 B1 * | 3/2016 | Wilden ............... H04W 64/00 |
| 2003/0009469 A1 | 1/2003 | Platt et al. |
| 2003/0099379 A1 | 5/2003 | Monk et al. |
| 2003/0146915 A1 | 8/2003 | Brook et al. |
| 2003/0214128 A1 | 11/2003 | Roberts et al. |
| 2004/0056202 A1 | 3/2004 | Rao |
| 2004/0073615 A1 | 4/2004 | Darling |
| 2004/0201692 A1 | 10/2004 | Parulski et al. |
| 2005/0010470 A1 | 1/2005 | Marino |
| 2005/0021822 A1 | 1/2005 | Cherkasova et al. |
| 2005/0105396 A1 | 5/2005 | Schybergson |
| 2005/0187943 A1 | 8/2005 | Finke-Anlauff et al. |
| 2006/0048059 A1 | 3/2006 | Etkin |
| 2006/0112080 A1 | 5/2006 | Chen et al. |
| 2006/0125930 A1 | 6/2006 | Mindrum et al. |
| 2006/0159007 A1 | 7/2006 | Frutiger et al. |
| 2006/0234769 A1 | 10/2006 | Srinivasan et al. |
| 2006/0251338 A1 | 11/2006 | Gokturk et al. |
| 2006/0287105 A1 | 12/2006 | Willis |
| 2007/0022447 A1 | 1/2007 | Arseneau et al. |
| 2007/0219949 A1 | 9/2007 | Mekikian |
| 2007/0260361 A1 | 11/2007 | Etcheson |
| 2007/0266047 A1 | 11/2007 | Cortes et al. |
| 2007/0294177 A1 | 12/2007 | Volk et al. |
| 2008/0005761 A1 | 1/2008 | Repasi et al. |
| 2008/0086511 A1 | 4/2008 | Takao |
| 2008/0114844 A1 | 5/2008 | Sanchez et al. |
| 2008/0133526 A1 | 6/2008 | Haitani et al. |
| 2008/0133697 A1 | 6/2008 | Stewart et al. |
| 2008/0136930 A1 | 6/2008 | Nagai |
| 2008/0144135 A1 | 6/2008 | Miers |
| 2008/0184139 A1 | 7/2008 | Stewart et al. |
| 2008/0186926 A1 | 8/2008 | Baio et al. |
| 2008/0189175 A1 | 8/2008 | Chan |
| 2008/0201299 A1 | 8/2008 | Lehikoinen et al. |
| 2008/0209010 A1 | 8/2008 | Zitnick, III et al. |
| 2008/0301736 A1 | 12/2008 | Heilbron et al. |
| 2009/0019902 A1 | 1/2009 | Baranek |
| 2009/0070412 A1 | 3/2009 | D'Angelo et al. |
| 2009/0171873 A1 | 7/2009 | Dolin et al. |
| 2009/0191902 A1 | 7/2009 | Osbourne |
| 2009/0199093 A1 | 8/2009 | Chakravarty |
| 2009/0248692 A1 | 10/2009 | Tsukagoshi et al. |
| 2009/0248703 A1 | 10/2009 | Tsukagoshi et al. |
| 2009/0276531 A1 | 11/2009 | Myka et al. |
| 2009/0279794 A1 | 11/2009 | Brucher et al. |
| 2009/0319472 A1 | 12/2009 | Jain et al. |
| 2010/0063961 A1 | 3/2010 | Guiheneuf et al. |
| 2010/0088182 A1 | 4/2010 | Ryder |
| 2010/0088336 A1 | 4/2010 | Johnston et al. |
| 2010/0124378 A1 | 5/2010 | Das et al. |
| 2010/0138295 A1 | 6/2010 | Caron et al. |
| 2010/0158315 A1 | 6/2010 | Martin |
| 2010/0169389 A1 | 7/2010 | Weber et al. |
| 2010/0198880 A1 | 8/2010 | Petersen |
| 2010/0223663 A1 | 9/2010 | Morimoto et al. |
| 2010/0232656 A1 | 9/2010 | Ryu |
| 2010/0241945 A1 | 9/2010 | Chen et al. |
| 2010/0250633 A1 | 9/2010 | Hannuksela et al. |
| 2010/0262916 A1 | 10/2010 | Jones et al. |
| 2010/0290699 A1 | 11/2010 | Adam et al. |
| 2010/0315664 A1 | 12/2010 | Miers |
| 2010/0318611 A1 | 12/2010 | Curtin et al. |
| 2011/0013845 A1 | 1/2011 | Tu et al. |
| 2011/0038512 A1 | 2/2011 | Petrou et al. |
| 2011/0066743 A1 | 3/2011 | Hurley et al. |
| 2011/0072035 A1 | 3/2011 | Gaucas et al. |
| 2011/0080424 A1 | 4/2011 | Peters et al. |
| 2011/0099199 A1 | 4/2011 | Stalenhoef et al. |
| 2011/0137709 A1 | 6/2011 | Meyer et al. |
| 2011/0138003 A1 | 6/2011 | Yoon et al. |
| 2011/0150324 A1 | 6/2011 | Ngan et al. |
| 2011/0161423 A1 | 6/2011 | Pratt et al. |
| 2011/0167136 A1 | 7/2011 | Naimark et al. |
| 2011/0183651 A1 | 7/2011 | Mundy |
| 2011/0208702 A1 | 8/2011 | Minde et al. |
| 2011/0211737 A1 | 9/2011 | Krupka et al. |
| 2011/0214077 A1 | 9/2011 | Singh et al. |
| 2011/0231240 A1 | 9/2011 | Schoen et al. |
| 2011/0235858 A1 | 9/2011 | Hanson et al. |
| 2011/0238631 A1 | 9/2011 | Cortes et al. |
| 2011/0252340 A1 | 10/2011 | Thomas |
| 2011/0270923 A1 | 11/2011 | Jones et al. |
| 2011/0276396 A1 | 11/2011 | Rathod |
| 2011/0276513 A1 | 11/2011 | Erhart et al. |
| 2011/0295667 A1 | 12/2011 | Butler |
| 2011/0296536 A1 | 12/2011 | Muller et al. |
| 2012/0005209 A1 | 1/2012 | Rinearson et al. |
| 2012/0007995 A1 | 1/2012 | Barrett |
| 2012/0016948 A1 | 1/2012 | Sinha |
| 2012/0023129 A1 | 1/2012 | Vedula et al. |
| 2012/0027256 A1 | 2/2012 | Kiyohara |
| 2012/0030194 A1 | 2/2012 | Jain |
| 2012/0047147 A1 | 2/2012 | Redstone et al. |
| 2012/0072428 A1 | 3/2012 | Kao |
| 2012/0079396 A1 | 3/2012 | Neer et al. |

(56) References Cited

U.S. PATENT DOCUMENTS

| | | | |
|---|---|---|---|
| 2012/0082378 A1 | 4/2012 | Peters et al. |
| 2012/0092685 A1 | 4/2012 | Barrett |
| 2012/0100869 A1 | 4/2012 | Liang et al. |
| 2012/0102409 A1 | 4/2012 | Fan et al. |
| 2012/0109901 A1 | 5/2012 | Mase |
| 2012/0114296 A1 | 5/2012 | Luo et al. |
| 2012/0122554 A1 | 5/2012 | Paquet et al. |
| 2012/0123867 A1 | 5/2012 | Hannan |
| 2012/0130823 A1 | 5/2012 | Levin |
| 2012/0136689 A1 | 5/2012 | Ickman et al. |
| 2012/0153016 A1 | 6/2012 | Slaby et al. |
| 2012/0158871 A1 | 6/2012 | Amano et al. |
| 2012/0179664 A1 | 7/2012 | Auerbach et al. |
| 2012/0213404 A1 | 8/2012 | Steiner |
| 2012/0214568 A1 | 8/2012 | Herrmann |
| 2012/0220314 A1 | 8/2012 | Altman et al. |
| 2012/0246003 A1 | 9/2012 | Hart et al. |
| 2012/0251011 A1 | 10/2012 | Gao et al. |
| 2012/0278387 A1 | 11/2012 | Garcia et al. |
| 2012/0324589 A1 | 12/2012 | Nukala et al. |
| 2013/0006882 A1 | 1/2013 | Galliani |
| 2013/0013683 A1 | 1/2013 | Elliott |
| 2013/0039547 A1 | 2/2013 | Liu et al. |
| 2013/0066963 A1 | 3/2013 | Odio et al. |
| 2013/0101220 A1 | 4/2013 | Bosworth et al. |
| 2013/0117365 A1 | 5/2013 | Padmanabhan et al. |
| 2013/0124311 A1 | 5/2013 | Sivanandan et al. |
| 2013/0129232 A1 | 5/2013 | Cok et al. |
| 2013/0141529 A1 | 6/2013 | Sathish |
| 2013/0166639 A1 | 6/2013 | Shaffer et al. |
| 2013/0232251 A1 | 9/2013 | Pauley |
| 2013/0305287 A1 | 11/2013 | Wong et al. |
| 2014/0047335 A1 | 2/2014 | Lewis et al. |
| 2014/0129942 A1 | 5/2014 | Rathod |
| 2015/0005010 A1 | 1/2015 | Zhang et al. |
| 2016/0070809 A1 | 3/2016 | Rathus |
| 2017/0124385 A1 | 5/2017 | Ganong et al. |

FOREIGN PATENT DOCUMENTS

| | | |
|---|---|---|
| CN | 102265649 | 11/2011 |
| CN | 102484646 | 5/2012 |
| CN | 102498486 | 6/2012 |
| CN | 104520882 | 4/2015 |
| JP | 2000-067057 | 3/2000 |
| JP | 2004-222056 | 8/2004 |
| JP | 2006-101095 | 4/2006 |
| JP | 2006101095 | 4/2006 |
| JP | 2007-249821 | 9/2007 |
| JP | 2008-077445 | 4/2008 |
| JP | 2008-146174 | 6/2008 |
| JP | 2008-146230 | 6/2008 |
| JP | 2008-225586 | 9/2008 |
| JP | 2009009204 | 1/2009 |
| JP | 2009-146079 | 7/2009 |
| JP | 2009-359238 | 11/2009 |
| JP | 2010-237751 | 10/2010 |
| JP | 2010-263621 | 11/2010 |
| JP | 2011-526013 | 9/2011 |
| JP | 2012-514276 | 6/2012 |
| KR | 10-2009-0080063 | 7/2009 |
| KR | 10-2010-0120282 | 11/2010 |
| KR | 10-2012-0029861 | 3/2012 |
| KR | 10-2012-0034600 | 4/2012 |
| WO | 2007/113462 | 10/2007 |
| WO | 2007/135871 | 11/2007 |
| WO | 2007/135971 | 11/2007 |
| WO | 2008/045701 | 4/2008 |
| WO | 2009/076555 | 6/2009 |
| WO | 2009082814 | 7/2009 |
| WO | 2010/075049 | 7/2010 |
| WO | 2010/108157 | 9/2010 |
| WO | 2011/001587 | 1/2011 |
| WO | 2011/149961 | 12/2011 |
| WO | 2011149961 | 12/2011 |
| WO | 2012/015919 | 2/2012 |

OTHER PUBLICATIONS

IPO, First Examination Report in Indian Application No. 1905/CHENP/2015, dated Oct. 23, 2019, 8 pages.
Notice of Allowance in Korean Application No. 10-2017-7026395, dated Aug. 28, 2019, 2 pages.
KIPO, Notice of Allowance in Korean Application No. 10-2015-7002159, dated Jun. 16, 2017, 2 pages.
KIPO, Notice of Final Rejection in Korean Application No. 10-2015-7002159, dated Feb. 10, 2017, 7 pages.
EPO, Office Action mailed in EP Application No. 13737075.5, dated Jul. 6, 2017, 5 pages.
UPSTO, Unpublished U.S. Appl. No. 13/346,385, filed Jan. 9, 2012.
APO, First Examination Report mailed in Australian Application No. 2016219660, dated May 12, 2017, 4 pages.
CIPO, Notice of Allowance in Canadian Application No. 2885504, dated May 2, 2017, 1 page.
SIPO, First Office Action in Chinese Application No. 2013800559264, dated May 31, 2017, 16 pages.
USPTO, Office Action mailed in U.S. Appl. No. 13/929,498, dated Jul. 13, 2017, 16 pages.
USPTO, Office Action mailed in U.S. Appl. No. 15/205,602, dated Jul. 13, 2017, 6 pages.
USPTO, Notice of Allowance received for U.S. Appl. No. 13/050,195, filed Mar. 17, 2011, dated Aug. 15, 2014, 35 pages.
JPO, Office Action received in Japanese Application No. 2013-554527, dated Aug. 18, 2015.
USPTO, Non-Final Rejection received for U.S. Appl. No. 13/050,195, filed Mar. 17, 2011, dated Mar. 28, 2014, 8 pages.
USPTO, Final Office Action in U.S. Appl. No. 15/092,102, dated Oct. 2, 2018, 11 pages.
USPTO, Non-Final Office Action mailed in U.S. Appl. No. 15/092,102, dated Apr. 2, 2018, 13 pages.
USPTO, Notice of Allowance for U.S. Appl. No. 13/661,425, dated Dec. 8, 2015, 14 pages.
USPTO, Non-Final Office Action in U.S. Appl. No. 14/162,708, dated Dec. 8, 2017, 15 pages.
USPTO, Final Office Action in U.S. Appl. No. 13/219,835, dated May 10, 2018, 15 pages.
KIPO, Korean Notice of Preliminary Rejection received in Korean Patent Application No. 10-2015-7002159 (with Translation), dated Jan. 26, 2016, 15 pages.
USPTO, Non-final Office Action for U.S. Appl. No. 13/050,195, dated Sep. 10, 2013, 16 pages.
USPTO, Final Rejection for U.S. Appl. No. 13/661,425, dated Mar. 10, 2015, 17 pages.
APO, Notice of Acceptance for Application No. 2013334606, dated Nov. 18, 2016, 2 pages.
APO, Patent Examination Report No. 1 for Australian Patent Application No. 2013334606, dated Nov. 25, 2015, 2 pages.
USPTO, Non-Final Rejection received for U.S. Appl. No. 14/571,213, dated Sep. 24, 2015, 21 pages.
USPTO, Notice of Allowance in U.S. Appl. No. 14/162,708, dated Jun. 28, 2018, 22 pages.
USPTO, Non-Final Rejection for U.S. Appl. No. 13/661,425, dated Sep. 18, 2014, 24 pages.
USPTO, Notice of Allowance received for U.S. Appl. No. 13/050,195, filed Mar. 17, 2011 dated Aug. 15, 2014, 27 pages.
USPTO, Notice of Allowance in U.S. Appl. No. 15/159,188, dated Jun. 26, 2018, 29 pages.
SIPO, Chinese First Office Action received in Chinese Patent Application No. 201180046353, dated Aug. 31, 2015, 29 pages.
APO, Second Examination Report in Australian Application No. 2016219660, dated Sep. 25, 2017, 3 pages.
SIPO, Notification of Grant in Chinese Application No. 201380055926.4, dated Dec. 1, 2017, 3 pages.
SIPO, Notification of Grant in Chinese Application No. 201380040026.2, dated Jul. 27, 2017, 3 pages.

(56) References Cited

OTHER PUBLICATIONS

USPTO, Non-Final Office Action in U.S. Appl. No. 13/219,835, dated Dec. 15, 2017, 31 pages.
USPTO, Notice of Allowance received for U.S. Appl. No. 13/534,555, filed Jun. 27, 2012, dated Oct. 23, 2015, 31 pages.
USPTO, Notice of Allowance in U.S. Appl. No. 15/205,602, dated Dec. 12, 2017, 33 pages.
EPO, Communication under Rule 71(3) in European Patent Application No. 13737075.5, dated Mar. 20, 2018, 37 pages.
JPO, Notice of Reasons for Rejection in Japanese Application No. 2015-520534, dated Oct. 22, 2018, 4 pages.
JPO, Non-Final Rejection for U.S. Appl. No. 13/542,379, filed Jul. 5, 2012, dated Nov. 19, 2015, 42 pages.
JPO, Decision of Rejection and Decision to Reject the Amendments in Japanese Application No. 2015-520534, dated Aug. 7, 2017, 6 pages.
USPTO, Non-Final Office Action in U.S. Appl. No. 15/960,394, dated Jul. 27, 2018, 6 pages.
EPO, Examination Report related to EP Patent Application No. EP11741726.1, dated Jan. 23, 2015, 6 pages.
EPO, Revised Office Action in EP Patent Application No. 11741726.1, dated May 28, 2015, 6 pages.
JPO, Notice of Allowance for Japanese Application No. 2013-554527, dated Nov. 20, 2015, 6 pages.
EPO, Supplementary Search Report in European Application No. 13786816.2, dated Jun. 3, 2016, 7 pages.
JPO, First Office Action in JP Application No. 2015-538160, dated Jun. 20, 2016, 7 pages.
JPO, Notice of Reasons for Rejection in Japanese Application No. 2015-520534, dated Jan. 16, 2017, 8 pages.
PCT, International Search Report and the Written Opinion of the International Search Authority received in related PCT Application No. PCT/US2013/066414, dated Jan. 29, 2014, 8 pages.
JPO, Notice of Reason for Rejection for Japanese Application No. 2013-554527, dated Aug. 18, 2015, 9 pages.
APO, Australian Patent Examination Report No. 3, in Australian Application No. 2012217920, dated Aug. 19, 2016, 4 pages.
EPO, Extended European Search Report, EP Application No. 13737075.5, dated Jan. 13, 2016, 8 Pages.
"Flickr—Photo Sharing", URL: http://www.flickr.com/, accessed on Sep. 27, 2011, Sep. 27, 2011, 7 pages.
JPO, Notice of Allowance for U.S. Appl. No. 2015-539724, dated Dec. 12, 2016, 3 pages.
JPO, Notice of Allowance for Japanese Patent Application No. 2015-538160, dated Dec. 5, 2016, 3 Pages.
JPO, Notice of Reasons for Rejection, Japanese Application No. 2015-539724, dated Apr. 4, 2016, 9 pages.
KIPO, Notice of Allowance in Korean Patent Application No. 10-2015-7010982, dated Sep. 29, 2016, 2 pages.
KIPO Notice of Last Preliminary Rejection, in Korean Patent Application No. 10-2015-7002159, dated Aug. 10, 2016, 11 pages.
KIPO Notice of Preliminary Rejection, Korean Patent Application No. 102015-7013481, dated Feb. 5, 2016, 11 Pages.
CIPO, Notice of Allowance, received for Canadian Application No. 2,885,504 filed Oct. 23, 2013, dated May 2, 2017, 1 page.
SIPO, Notice of Allowance in CN Application No. 201380055474.X, dated Feb. 24, 2018, 3 pages.
JPO, Notice of Reasons for Rejection, Japanese Application No. 2015-520534, dated Mar. 7, 2016, 9 pages.
"Picasa Web Albums", Retrieved from URL:http//picasa.google.com/, accessed on Sep. 27, 2011, Sep. 27, 2011, 1 page.
USPTO, Non-Final Rejection in U.S. Appl. No. 13/929,498, dated Feb. 13, 2017, 32 Pages.
USPTO, Non-Final Rejection cited in U.S. Appl. No. 13/219,835, dated Jul. 15, 2016, 49 pages.
Alt, et al., "Location-based Crowdsourcing: Extending Crowdsourcing to the Real World", Proceedings NordiCHI, Oct. 16-20, 2010, pp. 13-22.
APO, Examination Report for Australian Patent Application No. 2012217920, dated Nov. 25, 2014, 3 pages.

Chandramouli, et al., "Semantic Structuring and Retrieval of Event Chapters in Social Photo Collections", Proceedings of the International Conference on Multimedia Information Retrieval, MIR, New York, New York, Jan. 1, 2010, pp. 507-515.
CIPO, Office Action for Canadian Patent Application No. 2,885,504, dated May 25, 2016, 4 pages.
EPO, Written Opinion for International Patent Application No. PCT/US2012/024874, dated Aug. 18, 2013, 4 pages.
EPO, International Search Report for International Patent Application No. PCT/US2012/024874, dated Aug. 23, 2012, 4 pages.
EPO, International Search Report for International Patent Application No. PCT/US2011/045532, dated Jan. 19, 2012, 4 pages.
EPO, Communication pursuant to Article 94(3) EPC in European Application No. 12711045.0, dated Feb. 10, 2017, 6 pages.
EPO, Summons to Attend Oral Proceedings Pursuant to Rule 115(1) EPC for European Patent Application No. 11741726.1, dated May 29, 2017, 7 pages.
Google Inc., "Automatic Media Sharing Via Shutter Click", PCT Application No. PCT/US2011/045532, filed Jul. 27, 2011.
Hayakawa, "Remarkable Software at the Cutting Edge", MacPeople. ASCII Media Works Inc., vol. 15, No. 8, Aug. 1, 2009, p. 176.
Huang, et al., "Agent-mediated Personal Photo Sharing", International Journal of Electronic Business management, vol. 5, No. 1, Electronic Business management Society, Taiwan, Mar. 1, 2007, pp. 11-18.
WIPO, International Preliminary Report on Patentability for International Patent Application No. PCT/US2013/048318, dated Jan. 8, 2015, 4 pages.
WIPO, International Preliminary Report on Patentability for International Patent Application No. PCT/US2012/024874, dated Aug. 21, 2013, 5 pages.
JPO, Office Action/Rejection (with English translation) for Japanese Patent Application No. 2013-521938, dated Mar. 10, 2015, 8 pages.
Kim, et al., "Object Tracking in Video With Visual Constraints", U.S. Appl. No. 12/143,590, filed Jun. 20, 2008.
KIPO, Notice of Allowance mailed in Korean Patent Application No. 10-2015-7013481, dated Oct. 24, 2016, 2 pages.
KIPO, Notice of Preliminary Rejection (with English translation) for Korean Patent Application No. 10-2013-7004789, dated May 1, 2017, 10 pages.
KIPO, Notice of Preliminary Rejection for Korean Patent Application No. 102017-7026395, dated Jul. 10, 2018, 3 pages.
KIPO, Notice of Preliminary Rejection (with English translation) for Korean Patent Application No. 10-2015-7010982, dated Mar. 8, 2016, 9 pages.
Liu, et al., "Video-Based Face Recognition Using Adaptive Hidden Markov Models", Proceedings of the IEEE Computer Society Conference on Computer Vision and Pattern Recognition 1, CVPR, USA, Jun. 2003, pp. 340-345.
SIPO, Second Office Action (with English translation) for Chinese Patent Application No. 201180046353.X, dated Apr. 1, 2016, 14 pages.
SIPO, Notification of First Office Action mailed in Chinese application No. 201380040026.2, dated Nov. 28, 2016, 25 pages.
SIPO, Notification on Grant of Patent Right and Notification for Patent Registration Formalities for Chinese Patent Application No. 201180046353.X, dated Jul. 1, 2016, 4 pages.
SIPO, Notification of First Office Action mailed in Chinese application No. 201380055474.X, dated Feb. 27, 2017, 25 pages.
SIPO, "Second Office Action in Chinese Application No. 201380055474.X", dated Nov. 3, 2017, 20 Pages.
Ting-Hsiang, et al., "Agent-Mediated Personal Photo Sharing", International Journal of Electronic Business management, vol. 5, Issue 1, Mar. 2007, pp. 11-18.
USPTO, Non-final Office Action for U.S. Appl. No. 13/188,879, dated Dec. 16, 2011, 10 pages.
USPTO, Non-final Office Action for U.S. Appl. No. 13/246,628, dated Dec. 16, 2011, 10 pages.
USPTO, Final Office Action for U.S. Appl. No. 14/149,483, dated Dec. 21, 2016, 10 pages.
USPTO, Final Office Action for U.S. Appl. No. 13/346,385, dated Feb. 5, 2016, 11 pages.

(56) References Cited

OTHER PUBLICATIONS

USPTO, Non-final Office Action for U.S. Appl. No. 13/346,385, dated Jun. 30, 2016, 12 pages.
USPTO, Final Office Action for U.S. Appl. No. 15/159,188, dated Feb. 9, 2018, 14 pages.
USPTO, Non-final Office Action for U.S. Appl. No. 13/050,195, dated Jan. 29, 2013, 14 pages.
USPTO, Non-final Office Action for U.S. Appl. No. 13/542,379, dated Oct. 3, 2014, 14 pages.
USPTO, Non-final Office Action for U.S. Appl. No. 14/162,708, dated Sep. 27, 2016, 14 pages.
USPTO, Notice of Allowance for U.S. Appl. No. 13/534,555, dated Jun. 11, 2015, 15 pages.
USPTO, Notice of Allowance for U.S. Appl. No. 15/159,188, dated Jun. 26, 2018, 15 pages.
USPTO, Notice of Allowance in U.S. Appl. No. 15/159,188, dated Jun. 26, 2018, 15 pages.
USPTO, Final Office Action for U.S. Appl. No. 13/346,385, dated Oct. 20, 2016, 15 pages.
USPTO, Non-final Office Action for U.S. Appl. No. 13/346,385, dated Sep. 20, 2013, 16 pages.
USPTO, Non-final Office Action for U.S. Appl. No. 13/346,385, dated Apr. 7, 2017, 18 pages.
USPTO, Notice of Allowance for U.S. Appl. No. 13/050,195, dated Jan. 24, 2014, 21 pages.
USPTO, Non-final Office Action for U.S. Appl. No. 13/534,555, dated Sep. 30, 2014, 21 pages.
USPTO, Final Office Action for U.S. Appl. No. 13/346,385, dated Feb. 14, 2014, 23 pages.
USPTO, Non-final Office Action for U.S. Appl. No. 13/050,195, dated Mar. 28, 2014, 23 pages.
USPTO, First Action Interview, Pre-Interview Communication for U.S. Appl. No. 13/658,490, dated Mar. 18, 2014, 25 pages.
USPTO, Final Office Action for U.S. Appl. No. 13/658,490, dated Nov. 7, 2014, 27 pages.
USPTO, Notice of Allowance in U.S. Appl. No. 13/534,555, dated Mar. 8, 2016, 28 pages.
USPTO, Non-final Office Action for U.S. Appl. No. 13/929,498, dated Jul. 15, 2015, 29 pages.
USPTO, Final Office Action for U.S. Appl. No. 13/542,379, dated May 12, 2015, 30 pages.
USPTO, Final Office Action for U.S. Appl. No. 13/219,835, dated Oct. 9, 2013, 33 pages.
USPTO, Non-final Office Action for U.S. Appl. No. 13/219,835, dated Apr. 2, 2013, 36 pages.
USPTO, Non-final Office Action for U.S. Appl. No. 13/219,835, dated Oct. 24, 2014, 40 pages.
USPTO, Non-final Office Action for U.S. Appl. No. 13/658,490, dated Jul. 2, 2015, 41 pages.
USPTO, Non-final Office Action for U.S. Appl. No. 13/346,385, dated Jul. 22, 2015, 43 pages.
USPTO, Final Office Action in U.S. Appl. No. 13/929,498, dated Feb. 25, 2016, 48 pages.
USPTO, Final Office Action for U.S. Appl. No. 13/219,835, dated Jun. 4, 2015, 48 pages.
USPTO, International Search Report and Written Opinion for International Patent Application No. PCT/US2013/048318, dated Dec. 9, 2014, 5 pages.
USPTO, Notice of Allowance for U.S. Appl. No. 13/658,490, dated Feb. 19, 2016, 54 Pages.
USPTO, Non-final Office Action for U.S. Appl. No. 13/590,354, dated Apr. 18, 2013, 6 pages.
USPTO, Notice of Allowance for U.S. Appl. No. 13/246,628, dated Apr. 11, 2012, 7 pages.
USPTO, International Search Report and Written Opinion for International Patent Application No. PCT/US2013/066257, dated Apr. 25, 2014, 7 pages.
USPTO, First Action Interview, Office Action Summary for U.S. Appl. No. 13/658,490, dated Jul. 24, 2014, 7 pages.
USPTO, First Action Interview, Office Action Summary for U.S. Appl. No. 14/149,483, dated Jul. 26, 2016, 7 pages.
USPTO, Notice of Allowance for U.S. Appl. No. 13/188,879, dated May 22, 2012, 7 pages.
USPTO, Notice of Allowance for U.S. Appl. No. 13/590,354, dated Sep. 13, 2013, 8 pages.
USPTO, Final Office Action in U.S. Appl. No. 14/162,708, dated Mar. 22, 2017, 23 pages.
USPTO, Final Rejection in U.S. Appl. No. 13/219,835, dated May 10, 2018, 15 pages.
USPTO, Non-Final Office Action in U.S. Appl. No. 13/929,498, dated Feb. 13, 2017, 32 pages.
USPTO, Non-Final Office Action in U.S. Appl. No. 15/159,188, dated Nov. 2, 2017, 36 pages.
JPO, Notice of Reasons for Rejection for Japanese Patent Application No. 2017-23150, dated Nov. 16, 2018, 4 Pages.
USPTO, Notice of Allowance in U.S. Appl. No. 15/960,394, dated Dec. 12, 2018, 3 pages.
Notice of Preliminary Rejection in Korean Application No. 10-2017-7026395, dated Feb. 19, 2019, 6 pages.
Notice of Allowance in Japanese Application No. 2017-235150, dated Mar. 25, 2019, 3 pages.
First Examination Report in Indian Application No. 6583/CHENP/2013, dated Apr. 29, 2019, 6 pages.
"2nd Chinese Office Action in CN201710942176.2", dated Jan. 6, 2021.
CNIPA, Office Action (with English translation) mailed for Chinese patent application No. 201710942176.2, dated Mar. 30, 2020, 34 pages.
"Notification on the Grant of Patent Right For Invention in IN Application No. 201710942176.2", dated May 6, 2021, 8 Pages.

* cited by examiner

AUTOMATIC EVENT RECOGNITION AND CROSS-USER PHOTO CLUSTERING

CROSS-REFERENCE TO RELATED APPLICATIONS

This application is a continuation of U.S. application Ser. No. 14/162,708, filed Jan. 23, 2014, which is a continuation of U.S. application Ser. No. 13/219,835, filed Aug. 29, 2011, which claims the benefit of U.S. Prov. Pat. App. No. 61/444,520, filed Feb. 18, 2011, the disclosure of which is expressly incorporated herein by reference in its entirety.

TECHNICAL FIELD

This specification generally relates to data processing.

BACKGROUND

People take photographs (photos) to document events and to keep memories. People often share the photos with friends and family. In recent years, digital photography has become more mainstream. Using digital photography, a photographer can capture a photograph and store the photograph as a digital file. The digital file can be stored to computer-readable memory, can be copied and can be electronically distributed. The Internet has made the sharing of photos much easier. People can email photos to friends, or post them on websites for others to view. Social networking websites are also used to share photos with friends and acquaintances.

SUMMARY

Implementations of the present disclosure are generally directed to event recognition and cross-user photo clustering. In some implementations, first image data corresponding to a first image and second image data corresponding to a second image are compared to determine whether the first image and the second image correspond to a coincident event. The first image and the second image include respective digital photographs (photos) taken of an event by one or more users. In some implementations, two or more of timestamp data, geo-location data, content data and ancillary data are compared between the first image and the second image. In some implementations, if the first image and the second image correspond to a coincident event, a first user associated with the first image and a second user associated with the second image are notified. The first image and the second image can be published to an event page.

In general, innovative aspects of the subject matter described in this specification may be embodied in methods that include the actions of receiving, from a first user, first image data corresponding to a first image, receiving, from a second user, second image data corresponding to a second image, comparing the first image data and the second image data, and determining that the first image and the second image each correspond to an event based on the comparing, the event being coincident with respect to the first image and the second image.

These and other implementations may each optionally include one or more of the following features. For instance, actions further include providing an indication to the first user, the indication indicating that the second user has an image corresponding to the coincident event; actions further include receiving input from the first user, the input indicating a request to add the second image to a collection of images associated with the coincident event; actions further include providing the request to the second user; actions further include receiving input from the second user, the input indicating a response to the request; the second user is a member of a social network of the first user; the second user is a person determined to be in the first of image; the second user is a member of a social network of a person determined to be in the first image; the first image data includes a first timestamp and the second image data includes a second timestamp; comparing the first image data and the second image data includes: determining a difference between the first timestamp and the second timestamp, and determining that the difference is less than a threshold difference; the first image data includes first geo-location data and the second image data includes second geo-location data; comparing the first image data and the second image data includes: determining a distance between the first geo-location and the second geo-location, and determining that the distance is less than a threshold distance; the first image data includes first check-in data and the second image data includes second check-in data; comparing the first image data and the second image data includes: determining a first location specified by the first check-in data, determining a second location specified by the second check-in data, and determining that the first and second locations refer to a same geographical location; the first image data and the second image data each include at least one of timestamp data, geo-location data, check-in data and content data; comparing the first image data and the second image data includes: processing the content data of the first image data and the second image data, and identifying a landmark as being present in both the first image and the second image; comparing the first image data and the second image data includes: processing the content data of the first image data and the second image data, and identifying a human face as being present in both the first image and the second image; the first image data and the second image data each include ancillary data, the ancillary data including data added to the first image data and the second image data after generation of the first image data and the second image data; the ancillary data includes one or more tags indicating a presence of one or more particular persons in each of the first image and the second image; and actions further include: generating a confidence score based on the comparing, and determining that the confidence score exceeds a threshold confidence score, wherein determining that the first image and the second image correspond to a coincident event is based on the confidence score exceeding the threshold confidence score.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
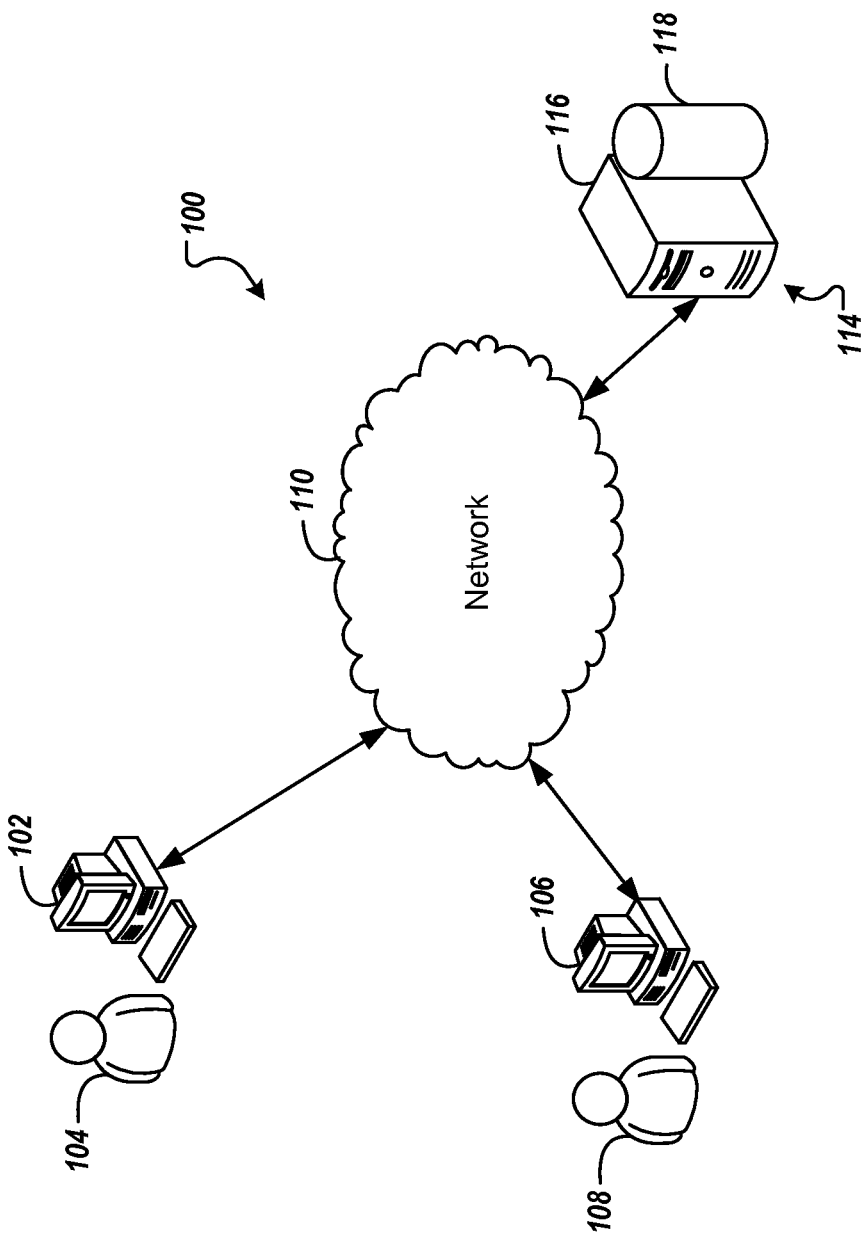
FIG. 1 depicts an example system that can be used in accordance with implementations of the present disclosure.

The present disclosure describes systems and techniques for recognizing the occurrence of an event from digital images provided as digital photographs (photos). Photos corresponding to the event can be clustered across multiple users. In particular, different users can take photos of a coincident event. For example, a first user can take photos of an event and a second user can take photos of the same event. The users can each upload their respective photos to a server or a system of servers for publication to a viewing audience. For example, each user can upload their respective photos to a social networking website for publication to other users of the social networking website. Data corresponding to each of the photos can be processed to determine that the photos of the different users correspond the same event. The data can include timestamp data, data regarding people identified within the photos, data regarding landmarks identified within the photos, and/or geographic location (geo-location) data indicating where the photos were taken. The data can also include other image analysis data, such as license plates, street signs, store fronts, bar codes, and other data.

In some implementations, photos of the same event are clustered across the multiple users. The clustering can include adding photos published by the second user to an event webpage created by the first user, and/or creating an event webpage or webpages designated for the event and uploading photos of the first and second users to the event webpage. In some implementations, user permission is requested before uploading their respective photos to the event webpage. In some implementations, the event data is displayed on an application on a computing device, rather than a webpage.

In some implementations, event recognition and photo clustering can be achieved based on one or more social graphs associated with a user of a social networking service. For example, a particular user of the social networking service can publish photos using the social networking service. Other users of the social networking service can also publish photos using the social networking service. Photos published by the other users can be reviewed in view of and can be selectively clustered with photos of the particular user. The review and clustering can be based on a social relationship between the particular user and the other users within the social networking service. The other users' photos can be searched to find more photos of the coincident event.

By way of non-limiting example, Alice and Bob can attend the wedding of Claire and David. In this example, the wedding of Claire and David is defined as an event. Alice and Bob can both take photos of the event and upload the photos for publication using a social networking service. Data underlying the photos can be processed such that the photos uploaded by Alice and Bob are recognized as being photos of the same event. For example, the data underlying the photos can indicate that at least a subset of Alice's photos and of Bob's photos each include Claire and David, and that the photos were both taken within a threshold timeframe of one another. In response to recognizing that the photos correspond to the same event, a request can be issued to Alice and Bob. The request can request whether Alice and Bob each want to include their photos in an event webpage created for event. The request can also include a request for a proposed event title (e.g., "Claire and David's wedding"). Alice and Bob can individually approve the inclusion of their photos in the event webpage.

Using Alice as an example user, photos taken by other users that are socially connected to Alice in the social networking service can be reviewed to determine whether photos uploaded by the other users also correspond to the event. This can also be done in view of Bob's social connections, as well as the social connections of each of Claire and David. In this manner, photos of a coincident event can be aggregated from different users, such that more photos of the event can be shared with the family and friends, beyond only the photos taken by a particular user. Photos of users indirectly connected to Alice (e.g., a connection of a connection, a connection of a connection of a connection, etc.) can also be reviewed to determine whether the photos correspond to the event.

FIG. 1 depicts an example system 100 that can be used in accordance with implementations of the present disclosure. The example system 100 includes a computing device 102 associated with a user 104, a computing device 106 associated with a user 108, a network 110, and a computing system 114. The computing device 102, the computing device 106 and the computing system 114 can communicate with each other through the network 110. The computing system 114 can include one or more computing devices 116 (e.g., one or more servers) and one or more computer-readable storage devices 118 (e.g., one or more databases).

Each computing device 102, 106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. The computing devices 102, 106, 116 may be provided access to and/or receive application software executed and/or stored on any of the other computing systems 102, 106, 116. The computing device 116 can represent various forms of servers including, but not limited to a web server, an application server, a proxy server, a network server, or a server farm.

In some implementations, the computing devices may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some implementations, the system 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., computing devices 102, 106) can communicate with servers (e.g., computing device 116) via a virtual private network (VPN), Secure Shell (SSH) tunnel, or other secure network connection. In some implementations, the network 110 may further include a corporate network (e.g., intranet) and one or more wireless access points.

Figure 2:
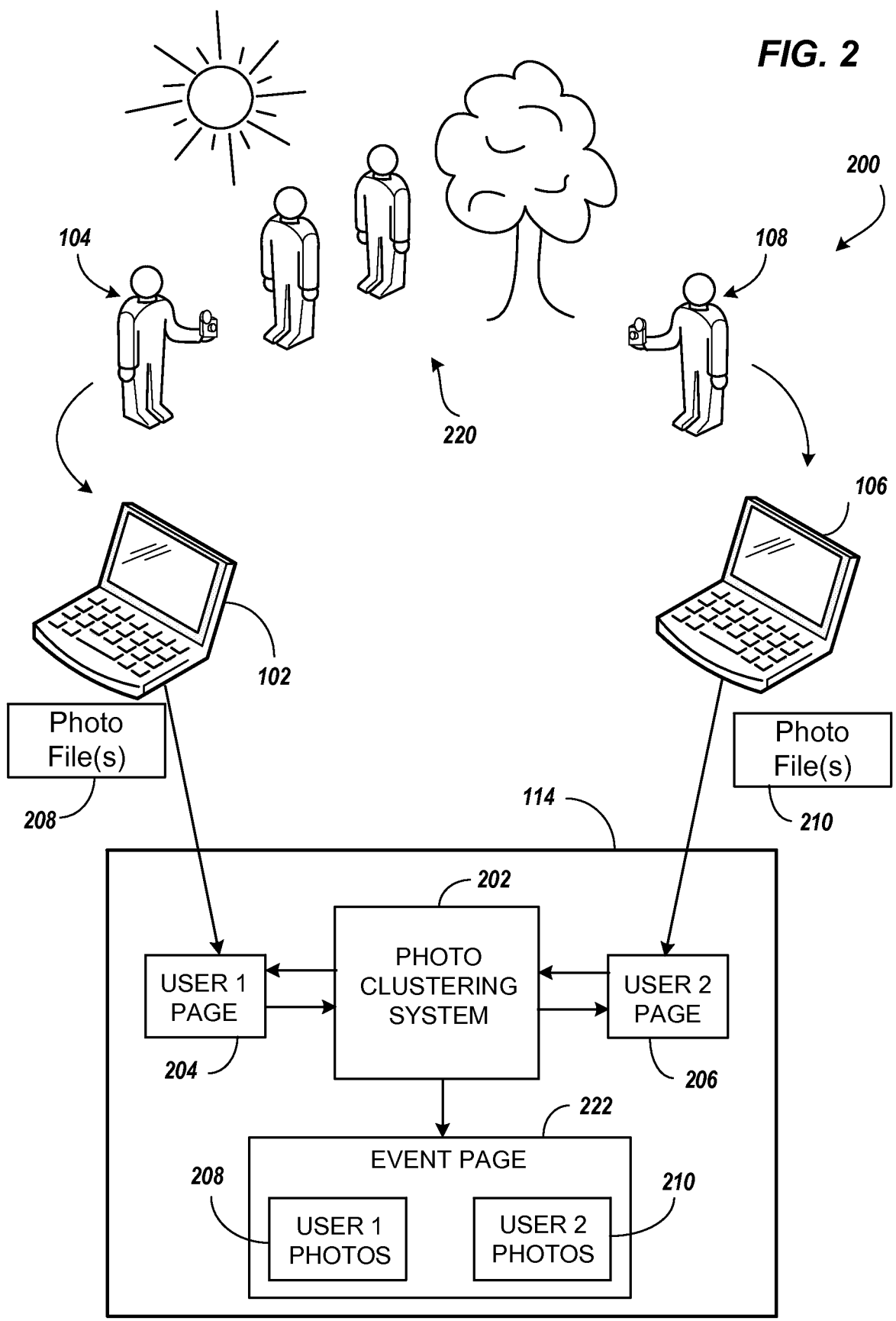
FIG. 2 depicts an example environment for event recognition and photo clustering.

FIG. 2 depicts an example environment 200 for event recognition and photo clustering. The example environment 200 includes a photo clustering system 202. The photo clustering system 202 can be implemented, for example, using one or more computing systems (e.g., the computing system 114 of FIG. 1). In some implementations, the photo clustering system 202 can be provided in the context of a social networking service. The social networking service can include a webpage or a profile page (e.g., user pages 204, 206) for respective users of the social networking service (e.g., users 104, 108 of FIG. 1). The user pages 204, 206 can be used to display information about the users 104, 108 that is posted, or otherwise published by the users 104, 108 using the social networking service. The user pages 204, 206 can also include photos, videos, or other media posted by the users 104, 108. The social networking service can also associate the user pages 204, 206 with other user pages, as described in further detail below.

By way of non-limiting example, each user 104, 108 takes photos of an event 220 using, for example, a digital camera or a smart phone. The users 104, 108 can transfer the digital photos to user devices 102, 106. That is, the users 104, 108 can each transfer files corresponding to their respective digital photos to computer-readable memory of the computing devices 102, 106. Using the respective computing devices 102, 106, the users 104, 108 can each upload respective files 208, 210 corresponding to the digital photos taken of the event 220 to their respective user pages 204, 206. In this manner, data stored in the files 208, 210 can be processed to publish the photos to the respective user pages 204, 206. The users 104, 108 can share their photos with their acquaintances through the social networking service. The users 104, 108, however, may not be aware of each other's photos of the event.

The photo clustering system 202 can compare data associated with the photos and stored in the files 208, 210 received from the users 104, 108 on the user pages 204, 206. In some implementations, the files 208, 210 include data corresponding to the photos taken by the users 104, 108. The data can include image content data, timestamp data, geo-location data, and/or check-in data. The timestamp data can correspond to when a particular photo was taken and the geo-location data and check-in data can correspond to where a particular photo was taken. The timestamp, geo-location, and check-in data can be associated with the particular photo as metadata by, for example, a smart phone that stores with the photo the time and location of the smart phone when the photo is taken. Digital cameras can also store time and location information with photos. The photo clustering system 202 can compare the data of the photos. Further, the system 202 can also compare the contents of photos. For example, the users 104, 108 or other users of the social networking service can tag the photos, providing identities of people in the photos. The system 202 can also use facial recognition techniques to identify people in photos. The system 202 can also detect recognizable landmarks in the photos, such as famous buildings or other unique backgrounds.

The photos can also include check-in data, which can be data provided by the user that the user was at a certain location at a certain time or for a certain duration of time, including when the photo was taken. For example, the users 104, 108, can check in at a specific location, such as a restaurant, indicating that the users 104, 108 were at the location at a specific time. Additionally, the check-in data can be provided automatically to the user. For example, a smart phone can be configured to automatically check in a user when the user is in certain locations. The check-in data can also refer to events in addition to, or instead of, locations. For example, a user can check in to a birthday party of a friend of the user.

The system 202 can compare photos at a time to detect coincident elements between the photos. When the system 202 detects coincident elements, the system 202 can determine that the photos 208, 210 are of the same event. In some implementations, the system 202 determines the photos are of the same event if the data associated with the photos indicates that the photos were taken at approximately the same time and near the same location. The system 202 can use the timestamp data to determine the time each photo was taken. The system 202 can include a threshold amount of time that is used to determine whether the photos are deemed to have been taken at approximately the same time. The system 202 can determine that photos taken within the threshold amount of time (e.g., X minutes, where X can be any positive number) of each other are close enough in time that the photos might be of the same event. For example, a difference between a first timestamp associated with a first photo and a second timestamp associated with a second photo can be determined. If the difference is less than or equal to the threshold amount of time, the first and second photos can be deemed to have been taken at approximately the same time. If the difference is greater than the threshold amount of time, the first and second photos can be deemed to have not been taken at approximately the same time.

With regard to whether the photos were taken at the same or approximately the same location, the system 202 can determine whether at least a particular person is in each of the photos, whether a particular landmark is in each of the photos, and/or whether respective geo-locations of the photos correspond to one another. For example, if two photos each include a particular person and were taken at the same or approximately the same time (discussed above), the photos can be deemed to have been taken at the same or approximately the same location. As another example, if a particular landmark (e.g., a building, a statue, a monument) is present in each of the photos, the photos can be deemed to have been taken at the same or approximately the same location.

As another example, geo-location data of the photos can indicate that the photos were taken at the same or approximately the same location. With regard to geo-location data, the system 202 can use a threshold distance of the respective geo-locations of the photos. If the distance between the geo-locations is less than the threshold distance, the photos are considered as having been taken at the same or approximately the same location. For example, a difference between a first geo-location associated with a first photo and a second geo-location associated with a second photo can be determined. If the difference is less than or equal to the threshold distance, the first and second photos can be deemed to have been taken at approximately the same location. If the difference is greater than the threshold distance, the first and second photos can be deemed to have not been taken at the same location.

As another example, check-in data can indicate that the photos were taken at the same or approximately the same location or event. For example, if two users check in to the same restaurant and each user takes a photo, the photos can be determined to have been taken at the same location. Or the two users can check in to a same event, such as the same birthday party. If the check-in data for two photos indicate the photos were taken at the same birthday party, the photos can be determined to have been taken at the same event.

The system 202 can also determine that a set of photos from one user are of one event. The system 202 can use information provided by the user, for example, the user can label a set of photos with an event title. Additionally, the system 202 can determine that two of the photos provided by one user are of the same event using the techniques described herein. The system 202 may also determine that photos received from one user and that were taken within a threshold time of one another are of the same event. The system 202 can use this information to determine that sets of photos provided by two users are of the same event. For example, the user 104 can upload a set of ten photos for publication to the user page 204. The user 108 can upload a set of five photos for publication to the user page 206. The photo clustering system 202 can process the photos and determine that the ten photos uploaded by the user 104 are of a coincident event. Similarly, the system 202 can process the photos and determine that the five photos uploaded by the user 108 are also of a coincident event. The photo clustering system 202 may then determine that at least one photo of the set uploaded by the user 104 is of a coincident event as at least one photo of the set uploaded by the user 108. For example, the photo clustering system can compare timestamp data, geo-location data, check-in data, and/or photo content, as discussed herein. The photo clustering system 202 can determine that all ten photos uploaded by the user 104 and all five photos uploaded by the user 108 are of the same event.

The photo clustering system 202 can also generate a confidence score as to whether photos are of a coincident event. The confidence score can be based on factors including a difference between the timestamps of the photos, a difference between the geo-locations of the photos, a confidence measure corresponding to whether a person detected in each of the photos is the same person, a confidence measure corresponding to whether a landmark detected in each of the photos is the same landmark, and/or a confidence measure corresponding to whether two check-in locations/events are the same location/event. The confidence score can also be based on how many elements of information the system determines to be the same or sufficiently similar between the photos. For example, if the timestamps of the two photos are within the threshold time, the same person is detected in each of the photos, and the same landmark is detected in each of the photos, a first confidence score can be provided. If the timestamps of the two photos are within the threshold time, but the same person is not detected in each of the photos, and/or the same landmark is not detected in each of the photos, a second confidence score can be provided, the second confidence score being less than the first confidence score. In some implementations, the confidence score can be lower when elements of the photos are different. For example, although photos may be taken at a similar time and each includes a person that is deemed to be the same person in both photos (e.g., based on facial recognition techniques and/or tagging), but the difference between the geo-locations of the photos is greater than the threshold distance, a relatively low confidence score can be provided.

The photo clustering system 202 can cluster the photos that are determined to be of the same event. In some implementations, an event page 222 can be generated. The event page 22 can include a webpage corresponding to the coincident event in the photos, and the photos can be published to the event page (e.g., upon approval of the owner of the photos). For example, the event page 222 can be a webpage provided by the social networking service, and can display information about the coincident event including the photos provided by the users 104, 108. The event page 222 can include privacy settings that allow only some users of the social networking service to view the page. For example, viewing of the event page 222 can be limited only to the social networking contacts of the users whose photos are included on the event page 222. Other privacy settings can also be used.

In some implementations, the event page 222 can be generated by a user. For example, a user (e.g., the user 104) can generate the event page 222 using the social networking service and can publish the photos to the event page 222. The photo clustering system 202 can determine that photos posted by another user (e.g., the user 108) of the social networking service correspond to the event associated with the event page 222. The other user (e.g., the user 108) can be notified of the existence of the event page 222, as discussed herein, and can provide permission to add their photos to the event page. In this manner, the photos of both users are published through the event page 222. In some implementations, the photo clustering system 202 can determine photos that are private to another user (e.g., the user 108) correspond to the event of the event page 222. The system can notify the user 108 and ask if the user 108 wants to publish and include the photos through the event page 222.

The users 104, 108 can each receive notifications requesting permission to add their photos to an event page 222. The notifications can include information about the other users who have added photos to the event page 222. Consequently, users can determine whether they want to share their photos with the users who have photos published to the event page 222. In some implementations, the users 104, 108 can upload photos and other media directly to an event page. Further, notifications can be used to confirm that the photos determined to be of a coincident event were, in fact, taken at the coincident event. For example, a user may receive a notification that an event page 222 has been created and that the user's photos may correspond to the event associated with the event page 222. The user can provide feedback indicating that the user's photos indeed do not correspond to the event associated with the event page 222. In this manner, the photo clustering system 202 can process the feedback to further improve the accuracy of coincident event detection.

In some implementations, the photo clustering system 202 can cluster photos based on different sets of similar elements. For example, if two photos do not both have timestamp data, but contain both a same landmark and a same person, the two photos can still be clustered as corresponding to a same event. Additionally, if two photos have check-in data corresponding to a same event, the two photos can be clustered as corresponding to a same event. In some implementations, the confidence score can be weighted depending on which elements are found to be similar.

In some implementations, photos with similar elements that do not include a similar time element (e.g., a similar timestamp or check-in data corresponding to a similar time) can be clustered together as corresponding to each other. For example, photos that include the Eiffel Tower can be clustered together regardless of time. These clustered photos can be further clustered as events if a subset of the clustered photos include data corresponding to a similar time that the subset of photos was taken.

Figure 3:
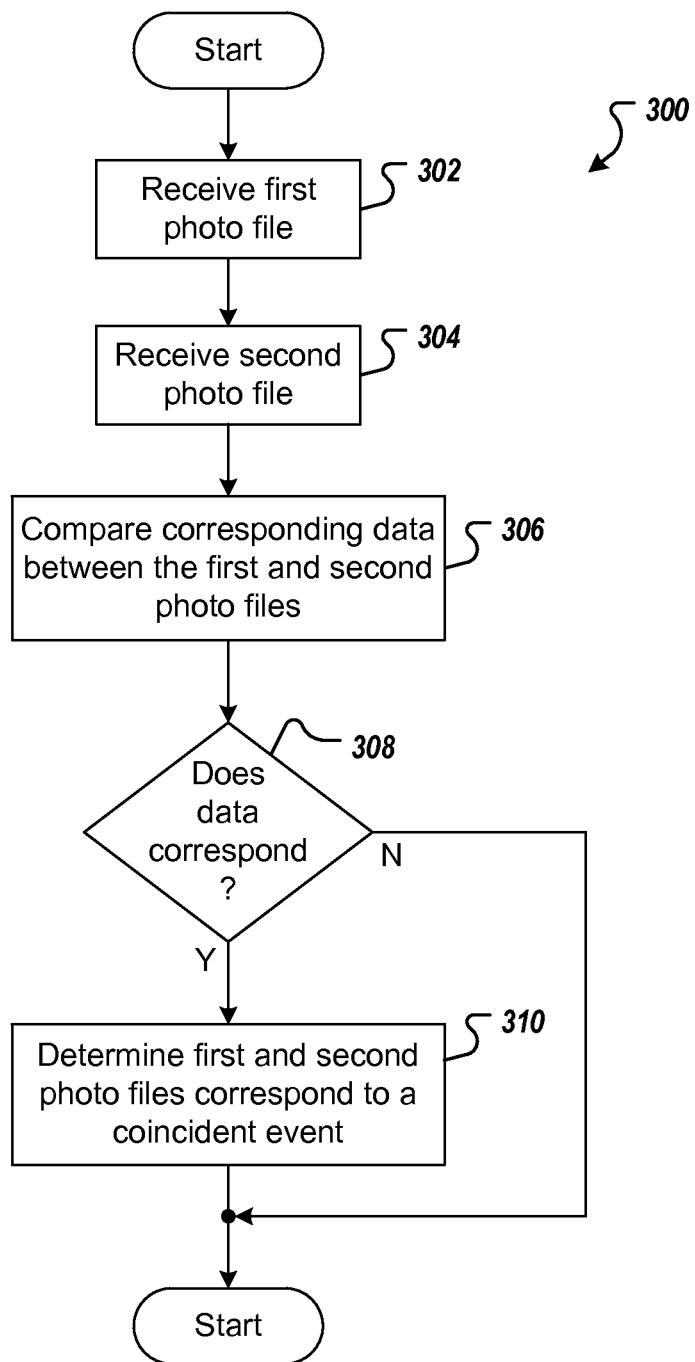
FIG. 3 is a flowchart of an example process for event recognition and photo clustering.

FIG. 3 is a flowchart of an example process 300 for event recognition and photo clustering. In some implementations, actions represented in the example process 300 may be performed by a computing system (e.g., the computing system 114 of FIG. 1).

A first photo file is received (302). The first photo file can be received by the computing system 114 of FIG. 1, for example. The first photo file can include data such as content data, timestamp data and geo-location data. The first photo file can also include ancillary data that can include tags or labels of people, objects, and/or locations in the photo and/or a time and date of the photo, including captions and comments. A second photo file is received (304). The second photo file can be received by the computing system 114 of FIG. 1, for example. The second photo file can include data such as content data, timestamp data and geo-location data. The second photo file can also include ancillary data that can include tags or labels of people, objects, and/or locations in the photo and/or a time and date of the photo, including captions and comments.

Corresponding data between the first and second photo files is compared (306). For example, the computing system 114 of FIG. 1 compares the corresponding data between the first and second photo files. The data first and second photo files can be compared on a data type-by-data type basis. For example, a first timestamp of the first photo file can be compared to a second timestamp of the second photo file. As another example, first geo-location data of the first photo file can be compared to second geo-location data of the second photo file. As another example, first check-in data of the first photo file can be compared to second check-in data of the second photo file. The data type-by-data type comparison can be performed for all of the data fields common to both the first and second photo files. If the data between the first and second photo files does not correspond, the first and second photos are deemed not to be of the same event. If the data between the first and second photo files corresponds, the first and second photos are deemed to be of the same event. The first and second photos files can be identified as corresponding to a coincident event (310). For example, event data can be added to each of the first and second photo files, the event data indicating that the first and second photo files correspond to a coincident event. In this manner, if the first photo file and a third photo file are deemed to correspond to a coincident event, the second photo file and the third photo file can automatically be deemed to correspond to a coincident event without processing of their respective data.

In some implementations, if the data of two or more common data fields between the first and second photo files correspond the first and second photo files are deemed to be of the same event. For example, if the timestamp data indicates that the first and second photos were taken at approximately the same time and the geo-location data indicates that the first and second photos were taken at approximately the same location, the first and second photo files are deemed to be of the same event. As another example, if the timestamp data indicates that the first and second photos were taken at approximately the same time and the content data indicates that the first and second photos include coincident content (e.g., at least one person common to both the first and second photos, at least one landmark common to both the first and second photos), the first and second photo files are deemed to be of the same event. As another example, if the content data indicates that the first and second photos include coincident content (e.g., at least one person common to both the first and second photos, at least one landmark common to both the first and second photos) and the geo-location data indicates that the first and second photos were taken at approximately the same location, the first and second photo files are deemed to be of the same event. Other combinations of correspondence between the data of the first and second photo files can also indicate that the first and second photo files are deemed to be of the same event.

In some implementations, facial recognition techniques can be applied to the content data of the first and second photo files to determine whether a particular person is in both the first and second photos. The identity of the person can remain anonymous. In some implementations, user-supplied information regarding identities of people in photos can be used to determine whether the same person is in both pictures. For example, one or more tags associated with the first and second photos can be compared to determine whether one or more particular people are in the first and second photos.

Figure 4:
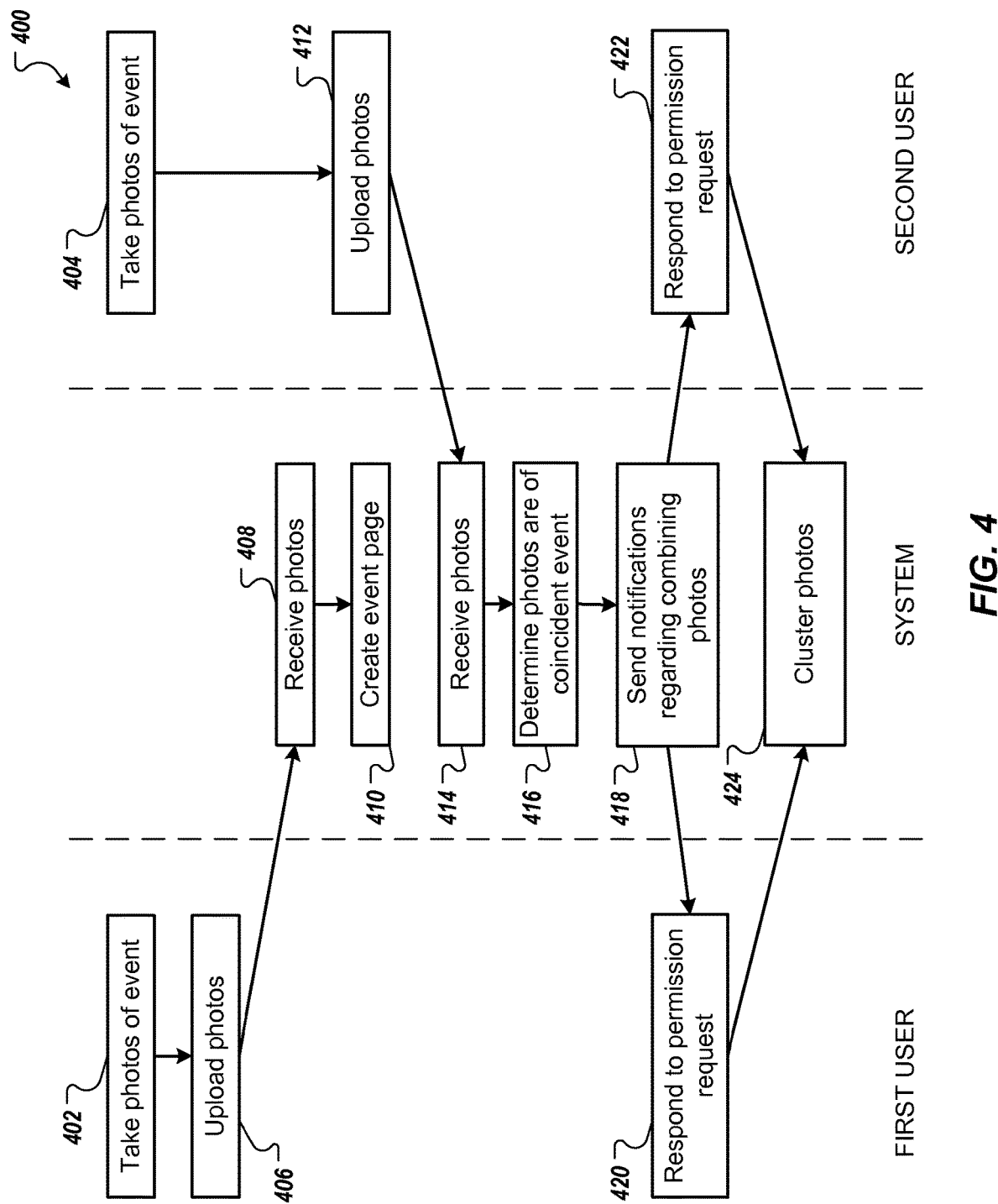
FIG. 4 is a swim lane diagram of an example process for event recognition and photo clustering.

FIG. 4 is a swim lane diagram 400 of an example process for event recognition and photo clustering. In some implementations, operations represented in the swim lane diagram 400 may be performed by one or more computing devices of a system such as the system 100 of FIG. 1.

A first set of photos of an event is generated (402). For example, a first user (e.g., user 104) takes photos of an event (e.g., event 220) using a digital camera that generates the first set of photos. A second set of photos of the event is generated (404). For example, a second user (e.g., user 108) takes photos of the same event (e.g., event 220) using a digital camera that generates the second set of photos. As the first and second users take photos of the same event, the photos are generated at a similar time (i.e., within a threshold time of one another) and in a similar location (i.e., within a threshold distance of one another).

The first set of photos are uploaded (406). The first user can upload the first set of photos to a computer system (e.g., the computing system 114 of FIG. 1) using a client device (e.g., the computing device 102 of FIG. 1). The first set of photos is received (408). For example, the computing system 114 of FIG. 1 receives the first set of photos. The computing system can be associated with a social networking service, and the first user can upload the first set of photos to a corresponding user page of the social networking service. Alternatively or additionally, the computing system can be associated with a photo sharing service and/or a data storage service, to which the first user can upload the first set of photos.

An event page is generated (410). The event page can include information about the event as well as the first set of photos. The information about the event can be received from the first user. Additionally, information about the event can be determined from the first set of photos. For example, the time and location of the event can be determined from data included with the photos of the first set of photos. The data can include a timestamp of when each photo was taken and a geo-location of where each photo was taken. The time and location can correspond to the time and location of the event. The first user can also provide information about the event such as a title of the event. The first user can also designate which photos were taken at the event.

The second set of photos is uploaded (412). The second user can upload the second set of photos to a computer system (e.g., the computing system 114 of FIG. 1) using a client device (e.g., the computing device 106 of FIG. 1). The second set of photos is received (414). For example, the computing system 114 of FIG. 1 receives the second set of photos. The computing system can be associated with the social networking service, and the second user can upload the second set of photos to a corresponding user page of the social networking service. Alternatively or additionally, the computing system can be associated with the photo sharing service and/or the data storage service, to which the second user can upload the second set of photos. The second user can also designate and provide information about the uploaded photos. For example, the second user can designate that certain photos are photos of the event.

Photos of the first set of photos and photos of the second set of photos are determined to be of a coincident event (416). Data associated with the photos received from the first user and the second user is compared to determine whether the photos are of the same event. The data can be compared using the techniques described herein. If the photos are determined to be photos of the same event, notifications are sent to the first and second users regarding combining the photos (418).

The first and second users can receive the notifications alerting them of the other user's photos of the event. The first and second users can respond to the permission requests (420, 422). If the first and second users both allow their respective photos to be combined on the same event page, the photos are clustered, or otherwise combined to the event page (424). If the first and second users both create event pages of the same event, the system can request permission to merge the two pages into one event page. Alternatively, the first or second user can decline the inclusion of their photos on the same event page as the other user. The system can provide separate event pages for each of the users, or no event page at all, depending on their responses to the permission requests. In addition, the system can have additional privacy settings, for example, users can prevent the system from notifying other users about their photos without their permission.

Figure 5:
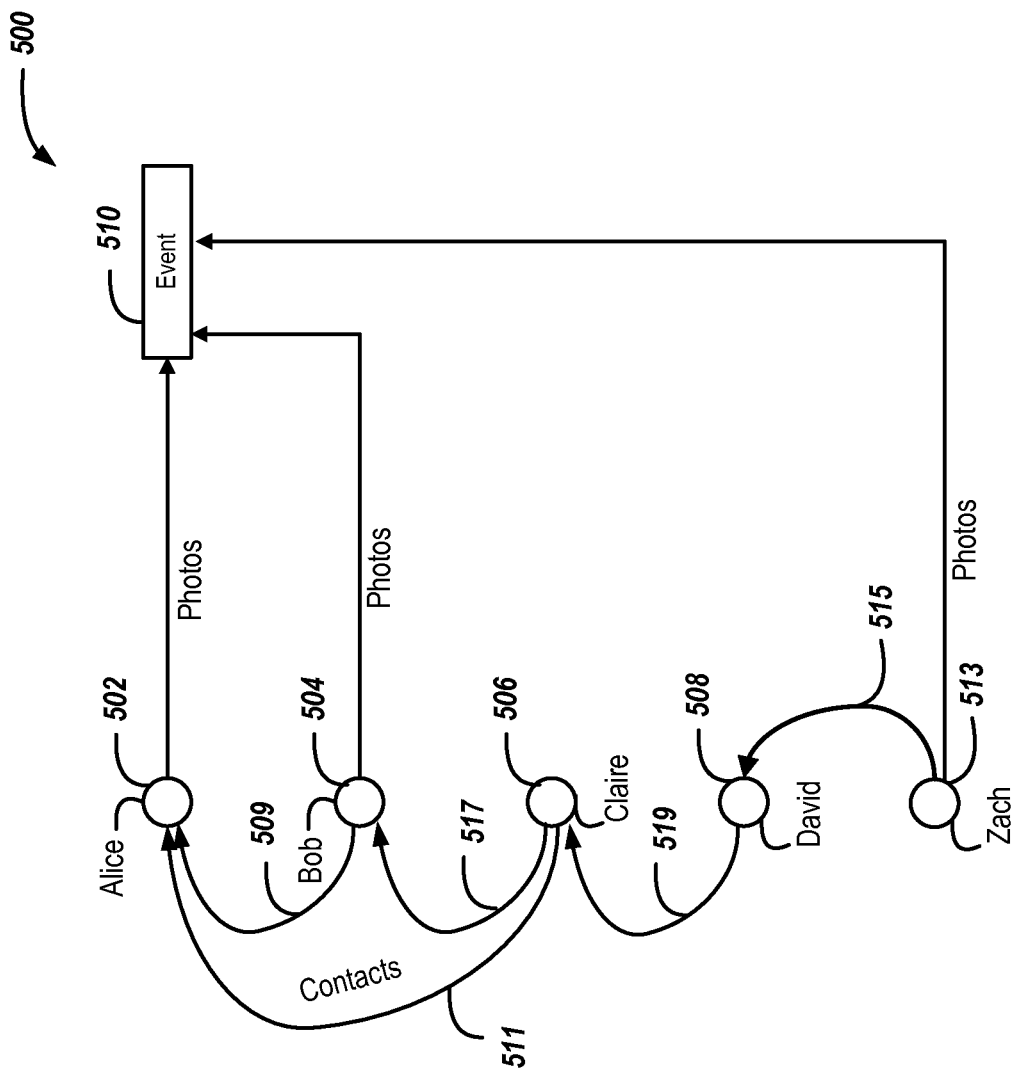
FIG. 5 depicts an example social graph.

FIG. 5 depicts an example social graph 500. The example social graph 500 corresponds to a user ("Alice") identified using a node 502. The social graph 500 can be determined based on Alice's use of a computer-implemented social networking service. For example, Alice can generate a profile within the social networking service and can digitally associate the profile with profiles of other users of the social networking service. Alice can upload photos that can be published using the social networking service. In the example social graph 500 of FIG. 5, other users of the social networking service include user ("Bob") identified by a node 504, user ("Claire") identified by a node 506, user ("David") identified by a node 508, and user ("Zach") identified by a node 513. Bob and Claire are both contacts of Alice within the social networking service, as indicated by edges 509, 511, respectively. Claire is a contact for Bob, as indicated by edge 517. David is a contact of Claire (edge 519), and Zach is a contact of David (edge 515). For example, Alice previously approved Claire and David as contacts in the social networking service, such that information and/or photos provided by Alice may be automatically shared with Claire and David. Likewise, previous approval can have occurred for the other contacts of the other users.

In the example social graph 500 of FIG. 5, David is not a contact of Alice within the social networking service. Instead, David may be another user of the social networking service that has limited access to the information and/or posts provided by Alice. Zach is a contact of David, as indicated by the edge 515, but is not a contact of Alice, Bob, or Claire.

In the example social graph of FIG. 5, Alice has uploaded photos of an event. In this example, the event can be Claire and David's wedding. The system can create an event page 510. In some implementations, the event page 510 may include a privacy setting, set by Alice as the first user who uploaded photos of the event, which enables any user of the social networking service to view and comment on the event page 510. In some implementations, Alice is able to establish a privacy setting of an event page such that only contacts of Alice within the social networking service, or a subset of contacts of Alice within the social networking service are able to view and comment on the event page.

The system can find Bob's photos of the event by searching through Alice's social contacts. The system can determine that Bob's photos, or a subset of Bob's photos corresponds to the event. The system can notify Alice that Bob has also uploaded photos of the event. The system can also notify Bob that Alice has created an event page for the photos of the event. If both Alice and Bob approve, the system can include both Alice and Bob's photos on the event page 510.

The system can also find Zach's photos of the event, even though neither Alice nor Bob are contacts of Zach. The photos can include pictures of Claire and David, as the event photographed is their wedding. The system can then search through Claire and David's contacts to determine if any of the photos they uploaded are also of the event. The system can therefore find Zach's photos of the event, and notify Zach of the event page 510. The system can also notify Alice to request permission to include Zach's photos in the event page. In some implementations, the system can request permission from both Alice and Bob. Alternative permission and privacy settings can be used for the event pages.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:
   a data processing apparatus including at least one programmable processor; and
   a non-transitory computer storage device encoded with a computer program, the computer program comprising instructions that when executed by the data processing apparatus cause the data processing apparatus to perform operations comprising:
   receiving first geo-location data, first time-stamp data, and first landmark data corresponding to a first image captured by a first user device of a first user;
   receiving second geo-location data, second time-stamp data, and second landmark data corresponding to a second image captured by a second user device of a second user;
   determining a geographical difference between the first geo-location data and the second geo-location data;
   determining a time difference between the first time-stamp data and second time stamp data;
   generating a same landmark confidence measure based, at least in part, on the first landmark data and the second landmark data;
   generating a total confidence score based, at least in part, on a number of elements meeting individual element threshold amounts indicating similarity between the first image and the second image, wherein the elements include at least two of the geographical difference, the time difference, and the same landmark confidence measure; and
   determining that the first image and the second image each correspond to a same event, based on the total confidence score meeting a threshold total confidence score.

2. The system of claim 1, wherein the operations further comprise clustering the first image and second image on a webpage for the same event.

3. The system of claim 1, wherein the elements further include a determination of whether at least one common person is in the first image and in the second image.

4. The system of claim 3, wherein the determination of whether the at least one common person is in the first image and in the second image includes an identity of the at least one common person being anonymous.

5. The system of claim 1, wherein receiving the first geo-location data, the first time-stamp data, and the first landmark data is from a first user webpage that includes the first image, and wherein receiving the second geo-location data, the second time-stamp data, and the second landmark data is from a second user webpage that includes the second image.

6. The system of claim 5, wherein the first image is a member of a first set of a plurality of images and the second image is a member of a second set of a plurality of images.

7. The system of claim 6, wherein a third image of the second set of the plurality of images is determined to correspond to the same event based on the determination that the second image corresponds to the same event.

8. A non-transitory computer-readable medium storing instructions that, when executed by one or more processors, cause the one or more processors to perform operations by a communication device, comprising:
receiving first geo-location data, first time-stamp data, and first landmark data corresponding to a first image captured by a first user device of a first user;
receiving second geo-location data, second time-stamp data, and second landmark data corresponding to a second image captured by a second user device of a second user;
determining a geographical difference between the first geo-location data and the second geo-location data;
determining a time difference between the first time-stamp data and second time stamp data;
generating a same landmark confidence measure based, at least in part, on the first landmark data and the second landmark data;
generating a total confidence score based, at least in part, on a number of elements meeting individual element threshold amounts indicating similarity between the first image and the second image, wherein the elements include at least two of the geographical difference, the time difference, and the same landmark confidence measure; and
determining that the first image and the second image each correspond to a same event, based on the total confidence score meeting a threshold total confidence score.

9. The computer-readable medium of claim 8, wherein the operations further comprise clustering the first image and second image on a webpage for the same event.

10. The computer-readable medium of claim 8, wherein the elements further include a determination of whether at least one common person is in the first image and in the second image, and wherein an identify of the at least one common person is anonymous.

11. The computer-readable medium of claim 8, wherein receiving the first geo-location data, the first time-stamp data, and the first landmark data is from a first user webpage that includes the first image, and wherein receiving the second geo-location data, the second time-stamp data, and the second landmark data is from a second user webpage that includes the second image.

12. The computer-readable medium of claim 11, wherein the first image is a member of a first set of a plurality of images and the second image is a member of a second set of a plurality of images.

13. The computer-readable medium of claim 12, wherein a third image of the second set of the plurality of images is determined to correspond to the same event based on the determination that the second image corresponds to the same event.

14. A method comprising:
receiving first geo-location data, first time-stamp data, and first landmark data corresponding to a first image captured by a first user device of a first user;
receiving second geo-location data, second time-stamp data, and second landmark data corresponding to a second image captured by a second user device of a second user;
determining a geographical difference between the first geo-location data and the second geo-location data;
determining a time difference between the first time-stamp data and second time stamp data;
generating a same landmark confidence measure based, at least in part, on the first landmark data and the second landmark data;
generating a total confidence score based, at least in part, on a number of elements meeting individual element threshold amounts indicating similarity between the first image and the second image, wherein the elements include at least two of the geographical difference, the time difference, er-and the same landmark confidence measure; and
determining that the first image and the second image each correspond to a same event, based on the total confidence score meeting a threshold total confidence score.

15. The method of claim 14, further comprising clustering the first image and second image on a webpage for the same event.

16. The method of claim 14, wherein the elements further include a determination of whether at least one common person is in the first image and in the second image.

17. The method of claim 16, wherein the determination of whether the at least one common person is in the first image and in the second image includes an identity of the at least one common person being anonymous.

18. The method of claim 14, wherein receiving the first geo-location data, the first time-stamp data, and the first landmark data is from a first user webpage that includes the first image, and wherein receiving the second geo-location data, the second time-stamp data, and the second landmark data is from a second user webpage that includes the second image.

19. The method of claim 18, wherein the first image is a member of a first set of a plurality of images and the second image is a member of a second set of a plurality of images.

20. The method of claim 19, wherein a third image of the second set of the plurality of images is determined to correspond to the same event based on the determination that the second image corresponds to the same event.

* * * * *